United States Patent
Lin et al.

(10) Patent No.: US 10,133,905 B2
(45) Date of Patent: Nov. 20, 2018

(54) CAPACITIVE FINGERPRINT SENSING UNIT AND ENHANCED CAPACITIVE FINGERPRINT READER

(71) Applicant: SunASIC Technologies, Inc., New Taipei (TW)

(72) Inventors: Chi-Chou Lin, New Taipei (TW); Zheng-Ping He, Taipei (TW)

(73) Assignee: SunASIC Technologies, Inc., New Taipei (TW)

( * ) Notice: Subject to any disclaimer, the term of this patent is extended or adjusted under 35 U.S.C. 154(b) by 352 days.

(21) Appl. No.: 14/958,982

(22) Filed: Dec. 4, 2015

(65) Prior Publication Data

US 2017/0161536 A1    Jun. 8, 2017

(51) Int. Cl.
*G06K 9/00* (2006.01)

(52) U.S. Cl.
CPC ......... *G06K 9/0002* (2013.01); *G06K 9/0008* (2013.01); *G06K 9/00053* (2013.01)

(58) Field of Classification Search
None
See application file for complete search history.

(56) References Cited

U.S. PATENT DOCUMENTS

| | | | | |
|---|---|---|---|---|
| 7,545,016 B2* | 6/2009 | Holz | ............... | H01L 27/14636 257/294 |
| 7,687,839 B2* | 3/2010 | Thomas | ............ | G06K 9/00053 257/296 |
| 8,633,525 B2* | 1/2014 | Thomas | ............ | G06K 9/00053 257/296 |
| 8,963,312 B2* | 2/2015 | Ho | ......................... | H01L 24/49 257/686 |
| 9,008,376 B2* | 4/2015 | Chiu | ................. | G06K 9/00013 382/124 |
| 9,147,100 B1* | 9/2015 | Lin | ..................... | G06K 9/00053 |
| 9,563,802 B2* | 2/2017 | Lin | ..................... | G06K 9/00053 |
| 9,836,636 B2* | 12/2017 | Lin | ..................... | G06K 9/0002 |
| 2014/0332968 A1* | 11/2014 | Ho | ..................... | H01L 23/49805 257/773 |
| 2016/0123775 A1* | 5/2016 | Chen | ....................... | G01D 5/24 324/663 |

* cited by examiner

*Primary Examiner* — Soo Park
(74) *Attorney, Agent, or Firm* — Che-Yang Chen; Law Offices of Scott Warmuth

(57) ABSTRACT

A capacitive fingerprint sensing unit and enhanced capacitive fingerprint reader using the capacitive fingerprint sensing units are disclosed. The enhanced capacitive fingerprint reader includes a number of capacitive fingerprint sensing units, forming a fingerprint sensing array; a conductive element; and an excitation signal driver, for providing excitation signals to the conductive element. By increasing the thicknesses of a first inter-metal dielectric layer and a second inter-metal dielectric layer in fingerprint sensing units in the enhanced capacitive fingerprint reader, sensitivity of the enhanced capacitive fingerprint reader can be improved.

15 Claims, 11 Drawing Sheets

CAPACITIVE FINGERPRINT SENSING UNIT AND ENHANCED CAPACITIVE FINGERPRINT READER

FIELD OF THE INVENTION

The present invention relates to a capacitive fingerprint sensing unit and a fingerprint reader. More particularly, the present invention relates to a capacitive fingerprint sensing unit and an enhanced capacitive fingerprint reader which has a conductive element for providing excitation signals to a finger.

BACKGROUND OF THE INVENTION

There are many human physiological characteristics which can be used to provide personnel identification for security purposes, such as fingerprint, retina, iris, DNA, or even face features. For all the devices that are capable of distinguishing some physiological characteristic of one person from others', a fingerprint reader has the lowest cost and complexity, while the identification results are generally pretty good. In addition, the size of data required to store the minutiae of one fingerprint is small (ranging from 120 bytes to 2K bytes). This makes fingerprint identification devices widely accepted in many fields.

There are also many types of sensing techniques for capturing fingerprint. The popular ones are optical type and capacitive type. Optical fingerprint sensing modules utilize reflected light intensity from the surface of a finger to tell where the ridges and valleys are on the contact portion of the finger. The advantage of the optical technique is reliability and low cost. However, due to the size of the embedded optical lens, the form factor of an optical fingerprint sensing module cannot be kept small. It is difficult for the optical type sensor to be embedded in portable devices. The capacitive type fingerprint identification modules, on the other hand, are made out of silicon chips and can be made very compact. In some cases, when a fingerprint image can be fetched by slide scanning, the fingerprint sensor can be even thin and slim, too. The small form factor of capacitive type fingerprint identification module makes it suitable for portable applications such as access control badges, bank cards, cellular phones, tablet computers, USB dongles, etc.

Capacitive fingerprint sensor is based on the physics principle that the capacitance of a two parallel metal plates capacitor is inversely proportional to the distance between two plates. A capacitive fingerprint sensor consists of an array of sensing units. Each sensing unit contains a sensing plate. By using the sensing plate as one plate of the two-plated capacitor and a dermal tissue as another plate, ridges and valleys of a finger can be located by measuring the different capacitances. There are many prior arts related to the capacitive type fingerprint identification module. For example, the U.S. Pat. No. 6,114,862 discloses a distance sensor. It has a capacitive element in turn having a first capacitor plate which is positioned facing a second capacitor plate whose distance is to be measured. In the case of fingerprinting, the second capacitor plate is defined directly by the skin surface of the finger being printed. The sensor includes an inverting amplifier, between the input and output of which the capacitive element is connected to form a negative feedback branch. By supplying an electric charge step to the input of the inverting amplifier, a voltage step directly proportional to the distance being measured is obtained at the output. Although a structure of the sensor is simple, the amplifiers suffer uniformity problem and their energy efficiency is not good.

Another prior art is disclosed in U.S. Pat. No. 7,663,380. Please refer to FIG. 1A and FIG. 1B. A capacitive fingerprint sensor comprises a fingerprint capacitor $C_F$, a reference capacitor $C_S$, a first transistor 33, a second transistor 34, a third transistor 35 and a fourth transistor 36. The fingerprint capacitor $C_F$ has a capacitance that is either a valley capacitance $C_{FV}$ or a ridge capacitance $C_{FR}$. The reference capacitor $C_S$ has a capacitance $C_S$, and $C_{FV} < C_S < C_{FR}$. The first transistor 33 is configured to pre-charge the reference capacitor $C_S$. The second transistor 34 is configured to pre-charge the fingerprint capacitor $C_F$. The third transistor 35 is configured to re-distribute the charges of the reference capacitor $C_S$ and fingerprint capacitor $C_F$. The fourth transistor 36 is configured to output the voltage of the reference capacitor $C_S$ after redistribution.

FIG. 1A further tells the equivalent circuit of the fingerprint sensor in the pre-charge phase. In the pre-charge phase for the fingerprint sensor, the readout select line $C_m$ (not shown) is asserted, the first transistor 33 and the second transistor 34 are enabled, and the voltages $V_A$ and $V_B$ pre-charge the reference capacitor $C_S$ and fingerprint capacitor $C_F$, respectively. FIG. 1B shows the same circuit in the evaluation phase. In the evaluation phase for the fingerprint sensor, a readout select line $C_{m+1}$ is asserted, the third transistor 35 is enabled, and the electrical charges stored in the reference capacitor $C_S$ and fingerprint capacitor $C_F$ are redistributed. At this moment, a scan line is still asserted, the fourth transistor 36 is enabled, and the readout select line output voltage depending on which portion of the human fingerprint, i.e., ridge or valley is detected. Apparently, the output voltage of the readout select line is larger if the ridge is detected, or smaller if the valley is detected. Thus, a fingerprint can be mapped based on the outputted voltages, varied with portions of the finger.

However, in practice, sensitivity of fingerprint sensing devices made by such capacitive fingerprint sensors is not high. When there is a protective layer on the top of the distance sensor, or the distance sensor is packaged in a molding compound, quality of fetched images gets worse.

Therefore, in order to resolve the problems mentioned above, an enhanced fingerprint reader is desired.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, a fingerprint sensing unit is disclosed. The fingerprint sensing unit includes: a base structure, having at least one first metal layer and forming a charging circuit and an operating circuit, for alternatively receiving a charging voltage and sharing electric charges from the charging circuit to a capacitance of the operating circuit while stopping receiving the charging voltage, and a fingerprint sensing structure, formed above the base structure, including: a first inter-metal dielectric layer, having a first depth greater than 3 μm; a second metal layer, formed above the first inter-metal dielectric layer and forming a sensing metal plate; a second inter-metal dielectric layer, formed above and around the second metal layer, covering the sensing metal plate and having a second depth greater than 3 μm; a third metal layer, formed above the second inter-metal dielectric layer, forming a rectangle cell with an opening located above the sensing metal plate, connecting to an Electrostatic Discharge (ESD) protective unit and maintaining electric potential of the third metal layer at signal ground; and a passivation layer, covering the third metal layer. The base structure shares electric charges from the charging circuit to capacitances of the fingerprint sensing structure while stops receiving the charging voltage.

Preferably, the ESD protective unit is connected to an ESD path for bypassing any ESD stress. The ESD protective unit contains at least one Transient Voltage Suppressor (TVS) device. A charging capacitor is built in the charging circuit for storing electric charges when the charging voltage is received and a parasitic capacitance exists in the operating circuit and a portion of the sensing structure. When a finger approaches the passivation layer, a signal capacitance is formed between the finger and the conductive element and a finger capacitance is formed between the finger and the sensing metal plate. A sharing switch is formed between the operating circuit and the charging circuit, for switching operations of receiving the charging voltage and sharing electric charges. An excitation signals include a first voltage and a second voltage. They are sent to the finger through the conductive element in the form of voltage. A voltage variation is obtained in the charging circuit when the second voltage takes place and the charging voltage stops being applied and the sharing switch turns on.

According to the present invention, the output voltage is $$V_{out} = \frac{C_r}{C_p + C_f + C_r} V_{dd} + \frac{1}{\left(1 + \frac{C_p + C_r}{C_f}\right)\left(1 + \frac{C_g}{C_s}\right)} (V_2 - V_1).$$

$V_{out}$ is a value of the output voltage, $V_{dd}$ is a value of the charging voltage, $V_1$ and $V_2$ are values of the first and of the second voltage, respectively, $C_r$ is a capacitance value of the charging capacitor, $C_p$ is a value of the parasitic capacitance, $C_f$ is a value of the finger capacitance, $C_g$ is a value of capacitance between the third metal layer and the finger, $C_s$ is a value of capacitance between the conductive element and the finger.

A discharging switch is formed in the operating circuit, for resetting the voltage of the operating circuit and that of the second metal layer to signal ground when the sharing switch is off. The same base structures or fingerprint sensing structures are adjacent to each other at the same level and the third metal layers of all fingerprint sensing units are connected so that a metal grid is formed.

Another aspect of the present invention is to provide a fingerprint reader. The fingerprint reader includes: the capacitive fingerprint sensing units mentioned above which forms fingerprint sensing array; a conductive element; and an excitation signal driver, for providing excitation signals to the conductive element. The excitation signal driver is an electrical component controlled by the fingerprint sensing array. The conductive element may be one or more metal strip(s) located close to the array of sensing units or a metal annulus plate enclosing the array of sensing units.

The present invention also provides a method to acquire a fingerprint using the fingerprint reader. The method includes the steps of: turning off the sharing switch to disconnect the charging circuit from the operating circuit; applying the first voltage to the conductive element and resetting the operating circuit and the second metal layer by turning on the discharging switch; applying the charging voltage to the charging circuit; turning off the discharging switch and the charging switch; turning on the sharing switch and providing the second voltage to replace the first voltage; measuring the output voltage; and translating the output voltage, from each enhanced capacitive fingerprint sensing unit, to a fingerprint image data corresponding to a portion of a user's fingerprint.

By increasing the thicknesses of the first inter-metal dielectric layer and the second inter-metal dielectric layer, the parasitic capacitance $C_p$ can be reduced. According to the $V_{out}$ formula mentioned above, the sensitivity of the enhanced capacitive fingerprint sensing unit is improved. The enhanced capacitive fingerprint reader is available.

DETAILED DESCRIPTION OF THE PREFERRED EMBODIMENTS

The present invention will now be described more specifically with reference to the following embodiments.

Figure 2:
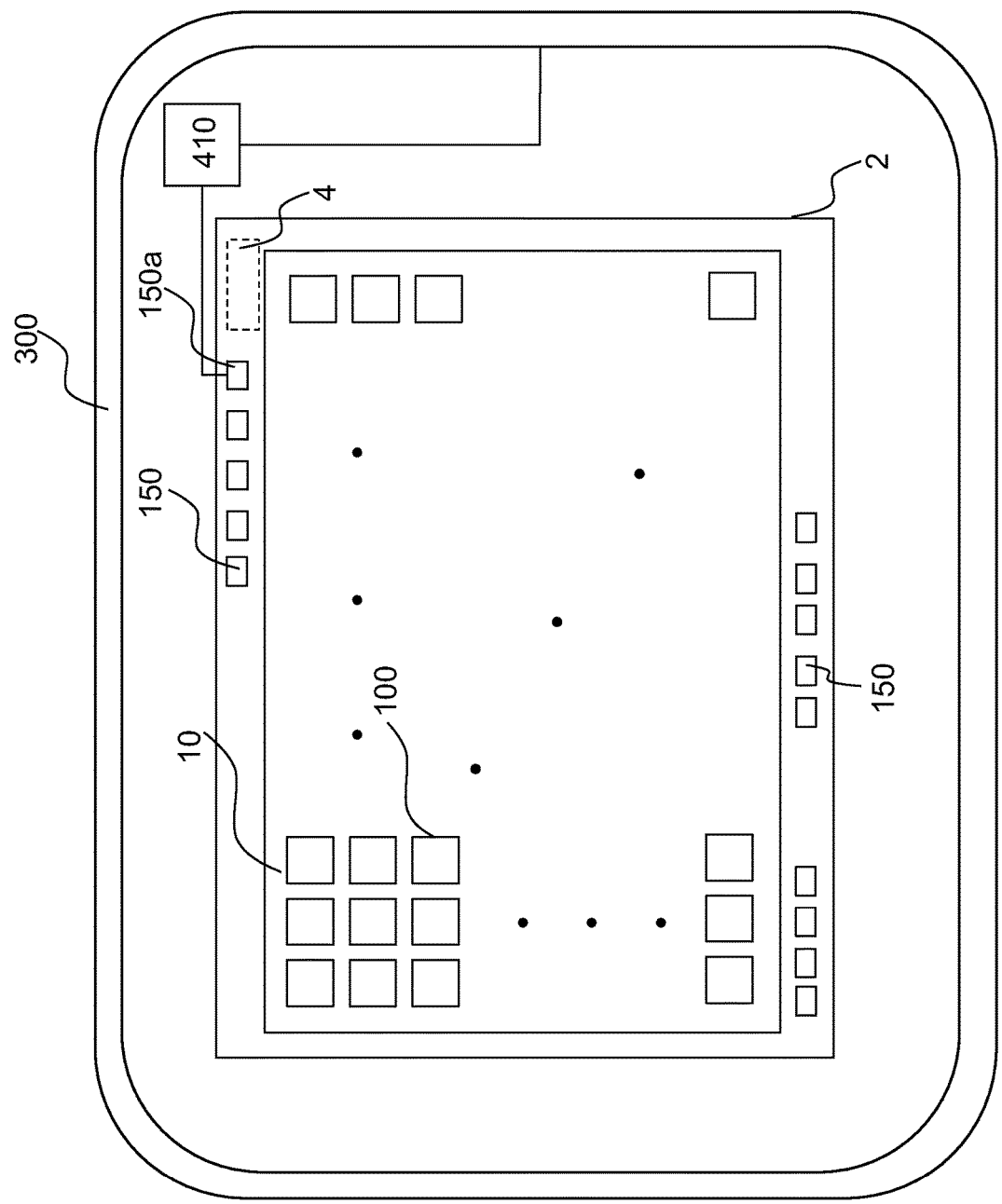
FIG. 2 is a top view of a fingerprint reader according to the present invention.
Figure 3:
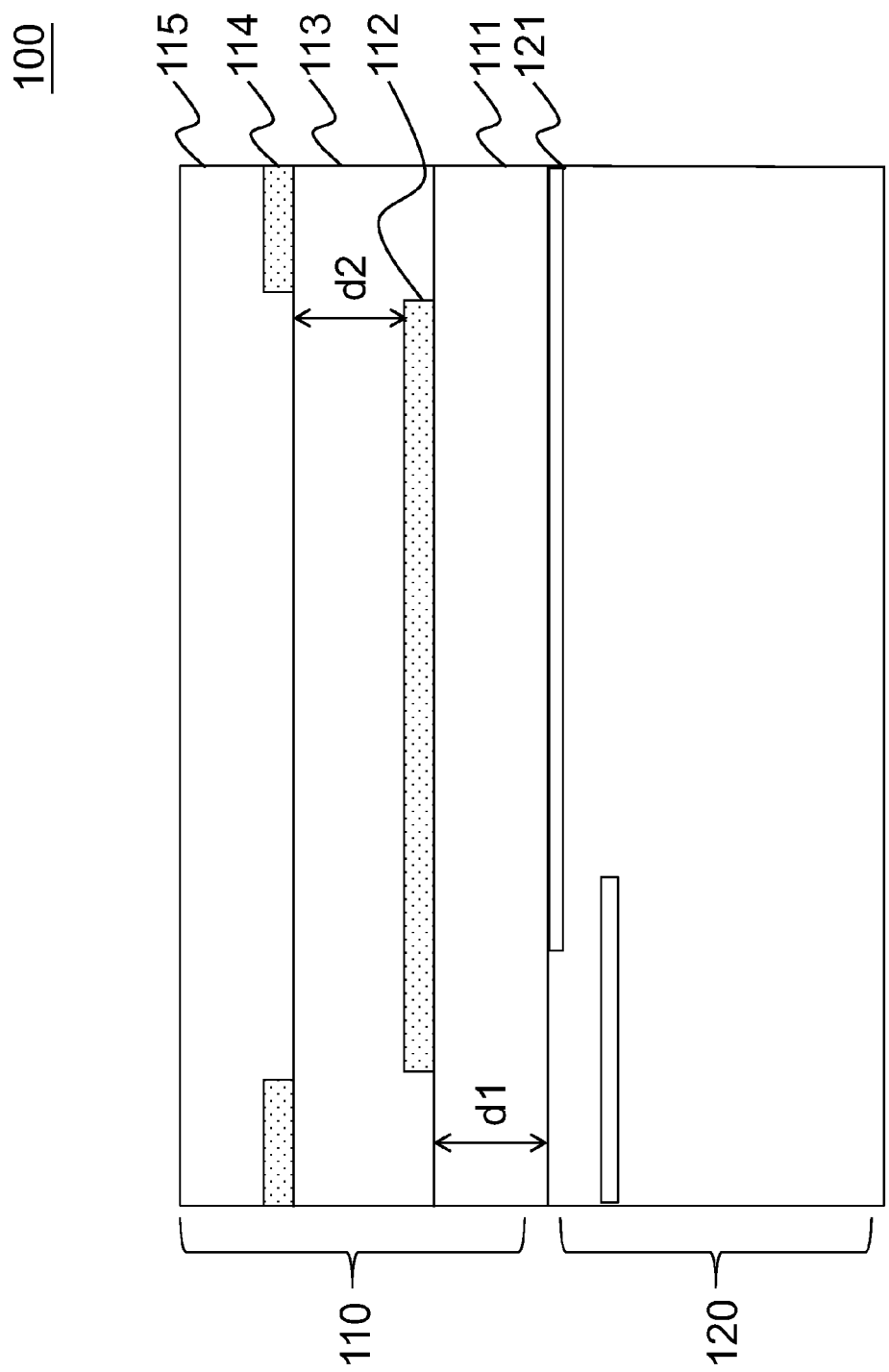
FIG. 3 shows a schematic diagram of an enhanced capacitive fingerprint sensing unit according to the present invention.
Figure 4:
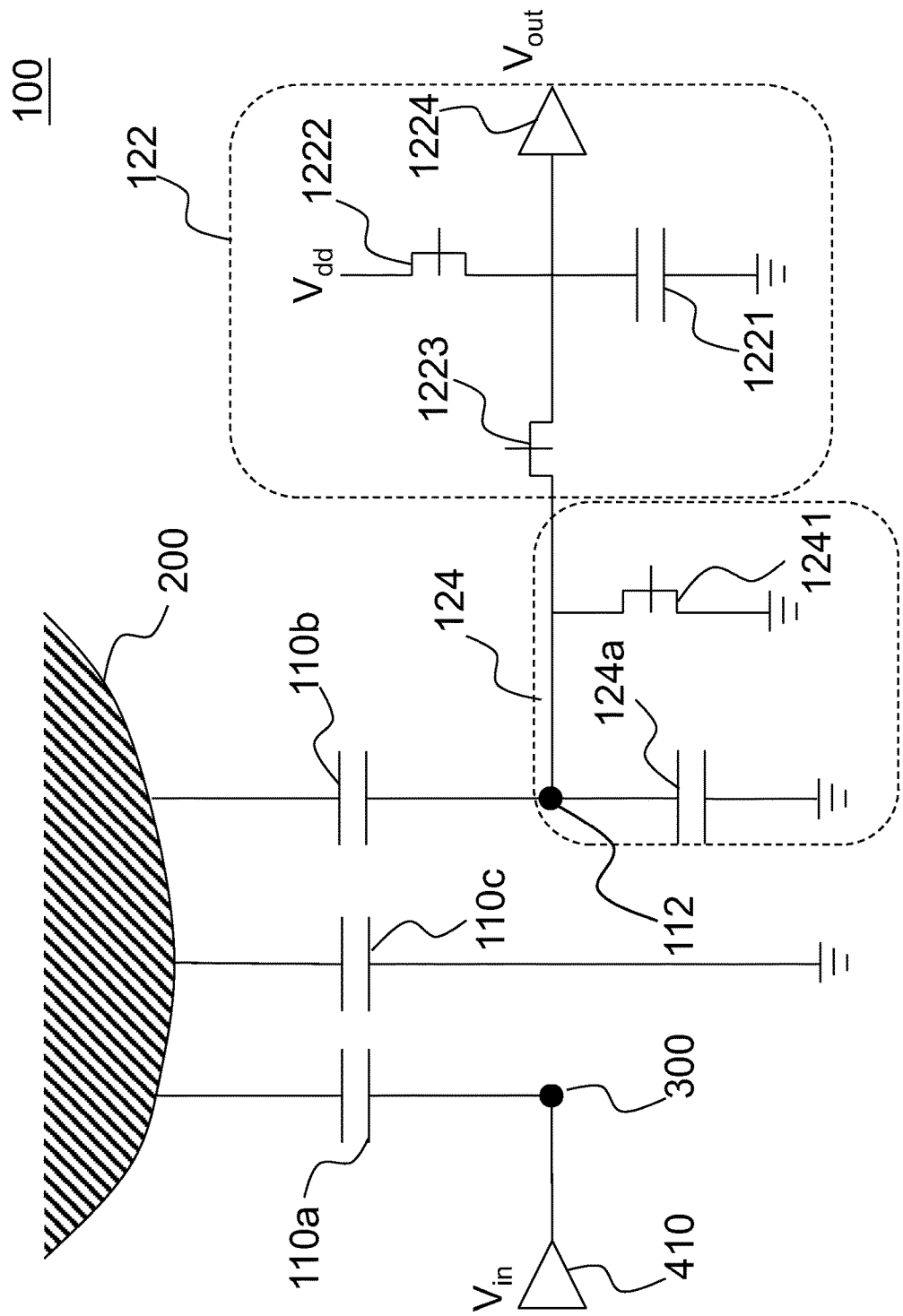
FIG. 4 is an equivalent circuit of the enhanced capacitive fingerprint sensing unit.
Figure 5:
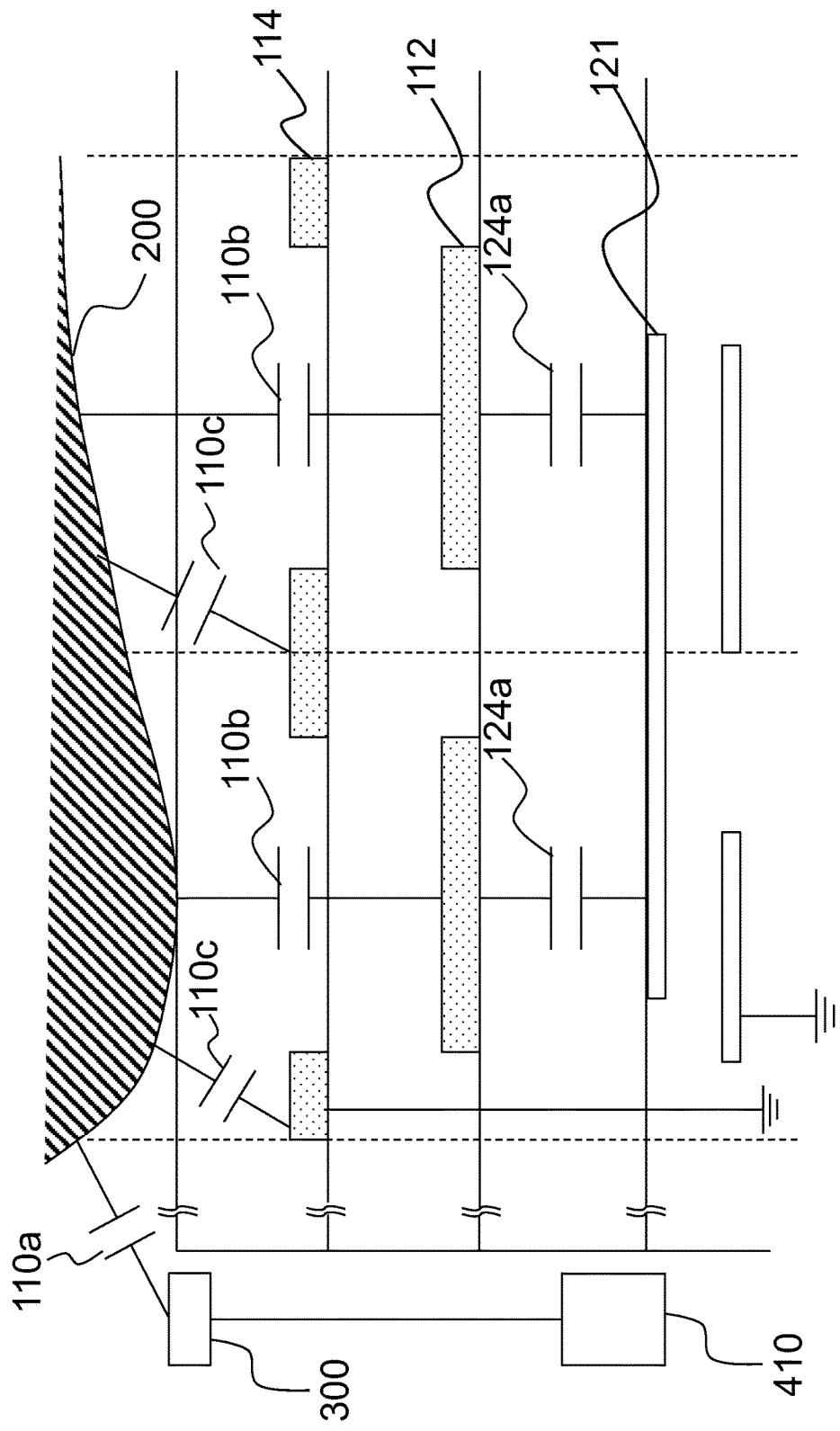
FIG. 5 illustrates the physical structure of two adjacent enhanced capacitive fingerprint sensing unit with a finger put on it and the capacitances formed therein.
Figure 6:
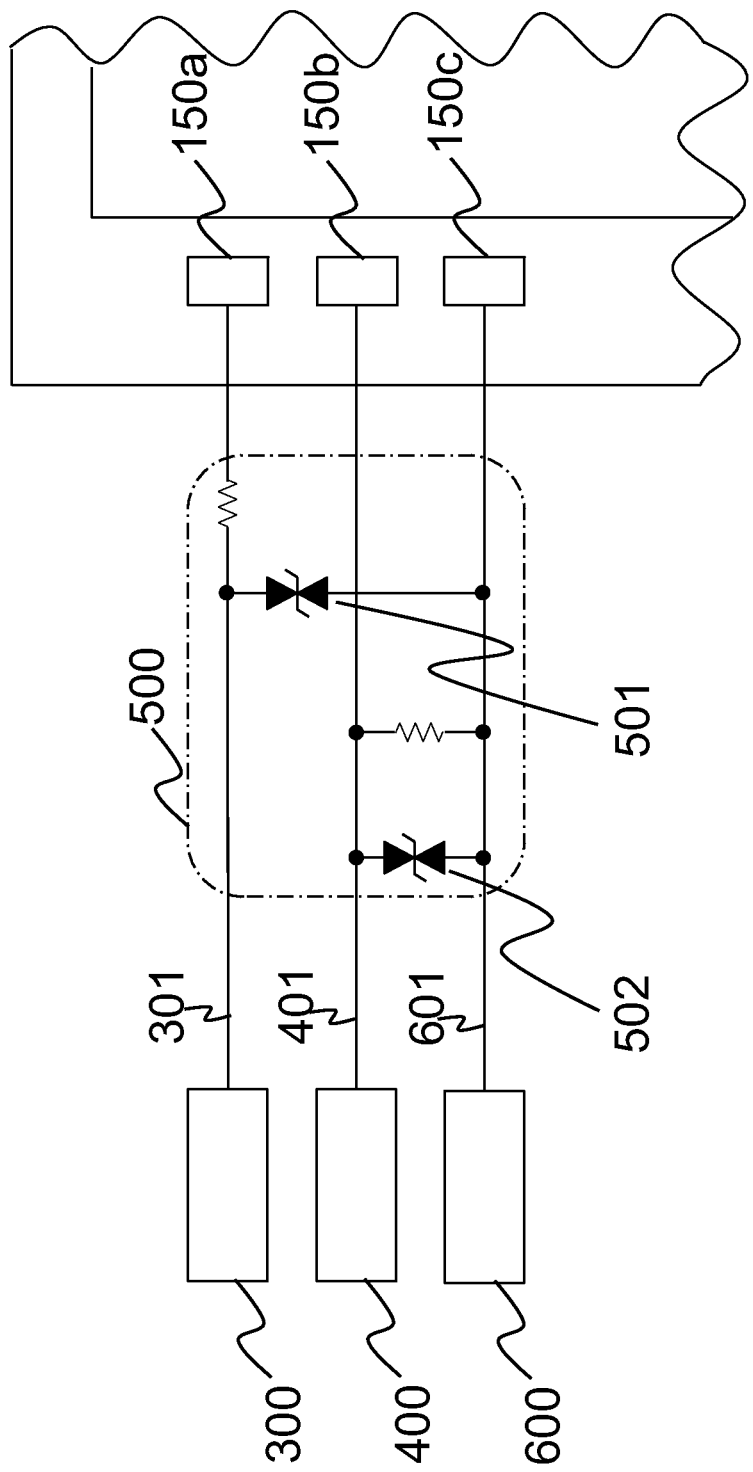
FIG. 6 shows an architecture of an ESD protective unit.
Figure 7:
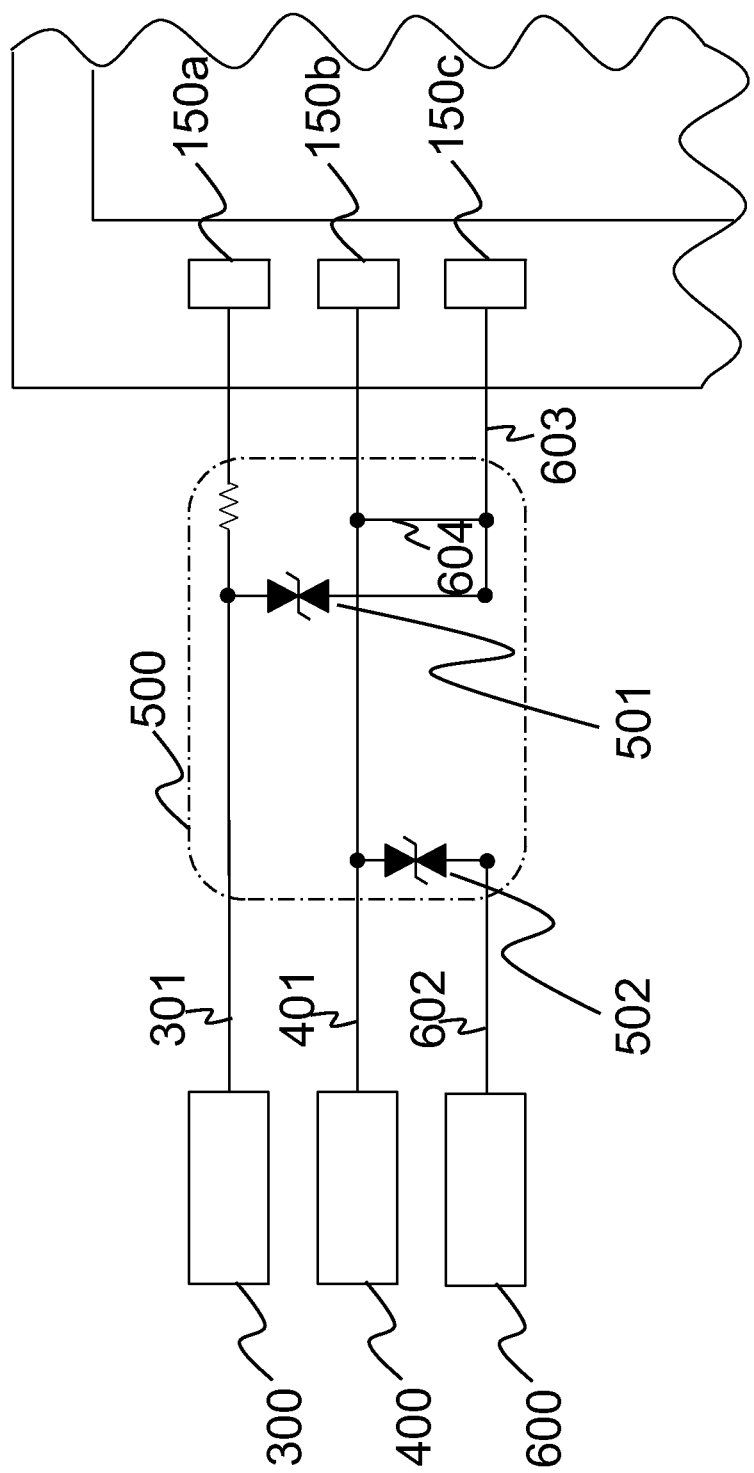
FIG. 7 shows another architecture of an ESD protective unit.
Figure 8:
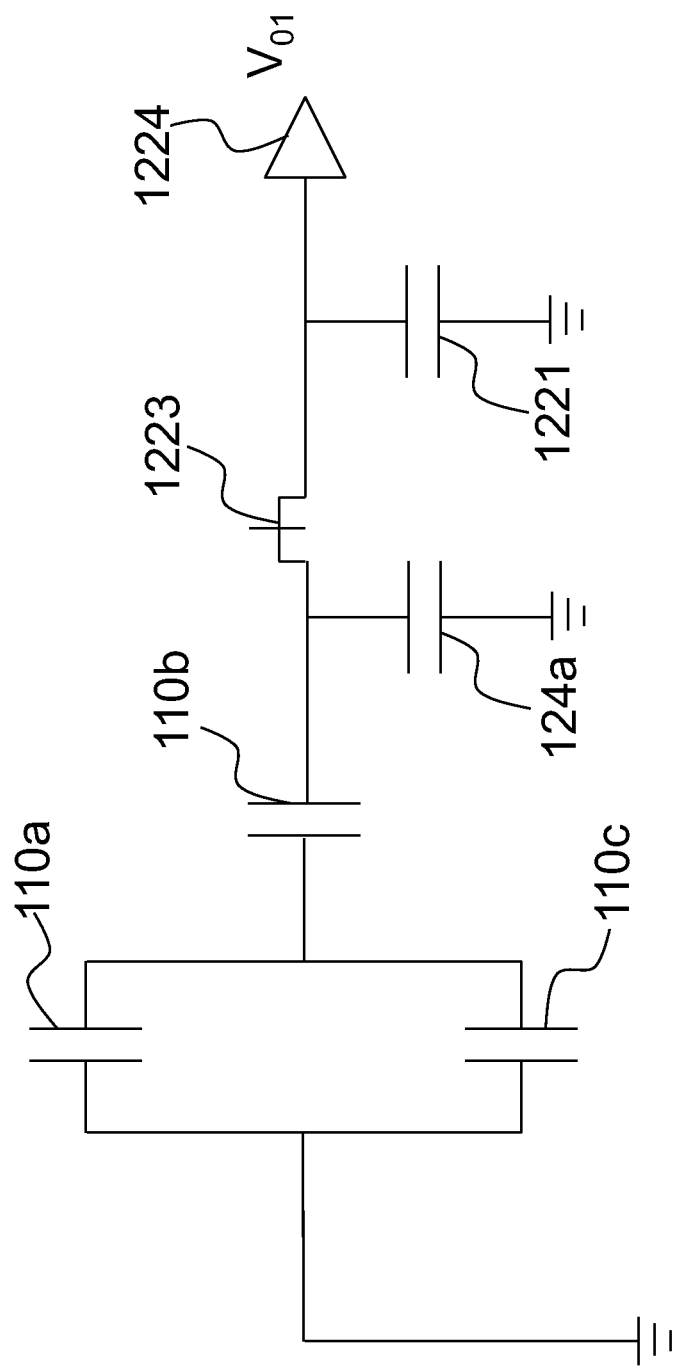
FIG. 8 shows an equivalent circuit for the charge sharing term of the output voltage.
Figure 9:
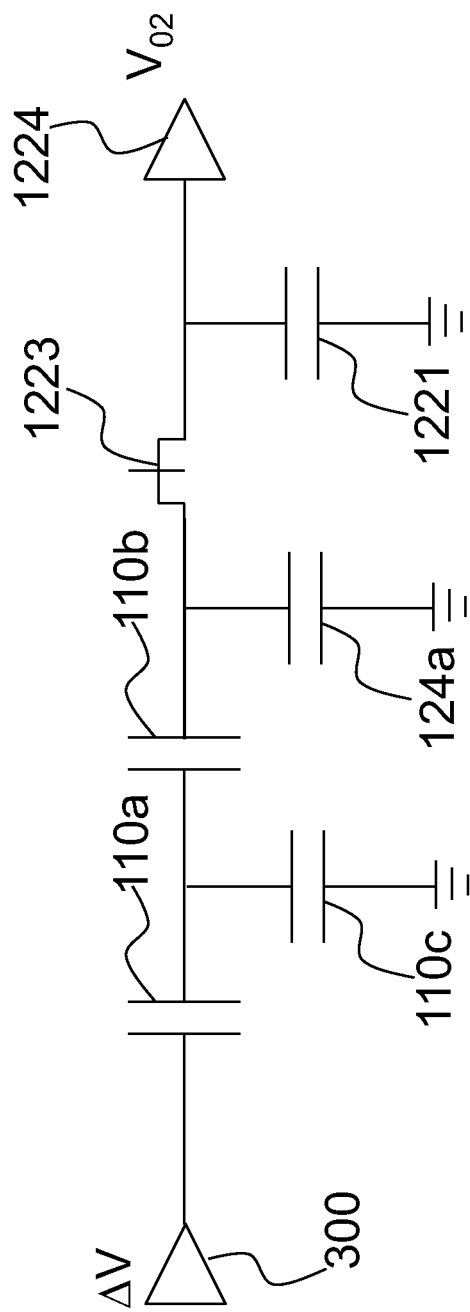
FIG. 9 shows an equivalent circuit for the second voltage term of the output voltage.
Figure 10:
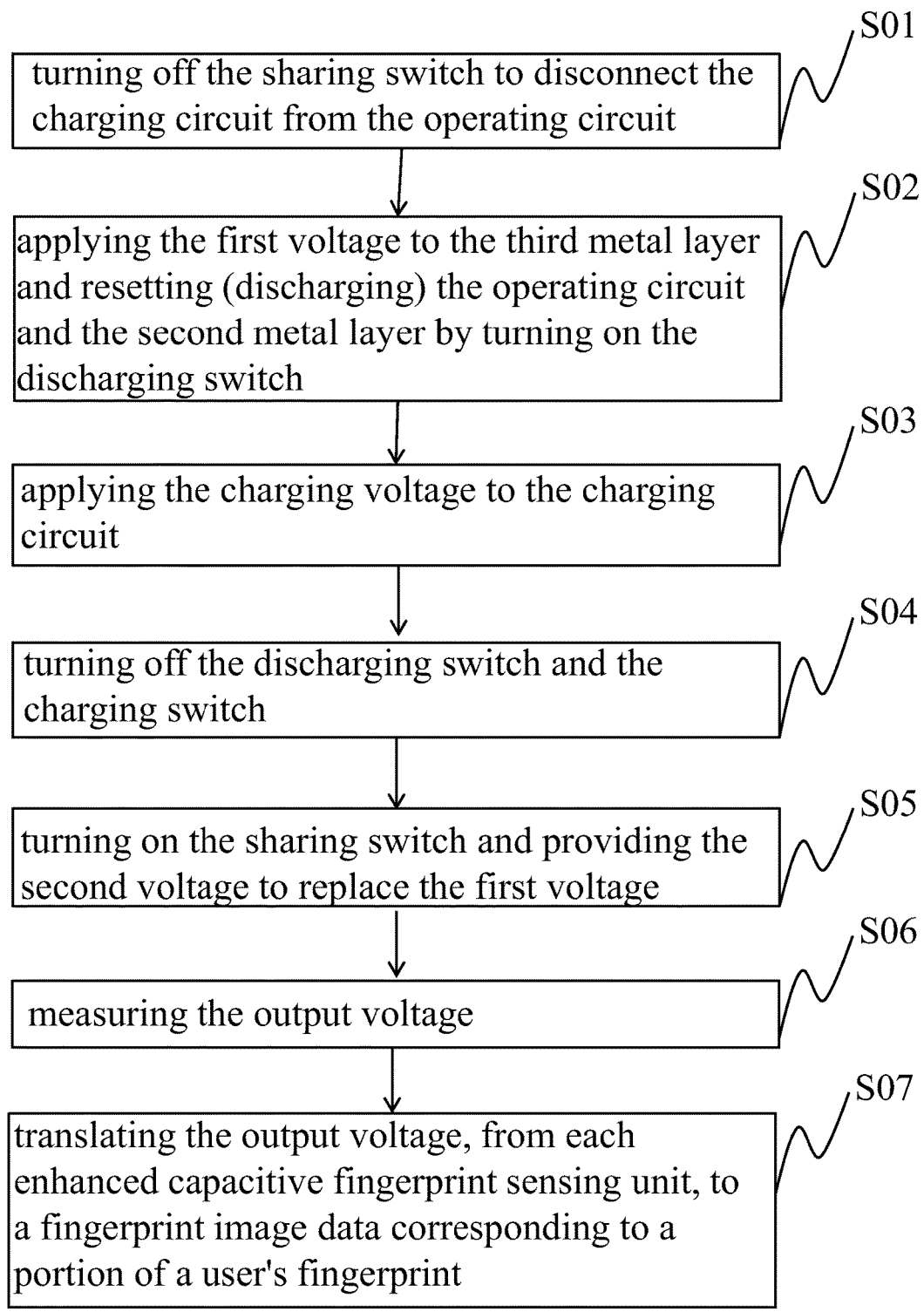
FIG. 10 is a flow chart for operating the equivalent circuit.

Please see FIG. 2 to FIG. 10. An embodiment according to the present invention is described. FIG. 2 is a top view of a fingerprint reader 1 according to the present invention. FIG. 3 shows a schematic diagram of an enhanced capacitive fingerprint sensing unit 100. FIG. 4 is an equivalent circuit of the enhanced capacitive fingerprint sensing unit 100. FIG. 5 illustrates the fingerprint sensing structure 110 and the corresponding equivalent capacitors located therein by showing two adjacent enhanced capacitive fingerprint sensing units 100. FIG. 6 shows an architecture of an ESD protective unit 500. FIG. 6 shows another architecture of the ESD protective unit 500. FIG. 8 shows an equivalent circuit for the charge sharing term of the output voltage while FIG. 9 shows an equivalent circuit for the second voltage term of the output voltage. FIG. 10 is a flow chart for operating the equivalent circuit.

As shown in FIG. 2. The fingerprint reader 1 is composed of a fingerprint sensor 2, a conductive element 300, and an excitation signal buffer 410. The fingerprint sensor 2 is composed of a fingerprint sensing array 10, an excitation signal driver 4, and a number of Input/output (I/O) pads 150. The fingerprint sensing array 10 has a number of enhanced capacitive fingerprint sensing units 100. Functions and structure of the enhanced capacitive fingerprint sensing unit 100 will be described later. The conductive element 300 is a metal annulus plate enclosing the enhanced capacitive fingerprint sensing units 100. According to the spirit of the present invention, the metal annulus plate can be in any shape. For example, a ring shape or even an irregular shape. The excitation signal buffer 410 is an electrical component controlled by the fingerprint sensor 2. The excitation signal buffer 410 is linked to the excitation signal driver 4 formed inside the fingerprint sensor 2 via an excitation signal pad 150a. When an object (finger) measured by the fingerprint sensor 2 approaching, the excitation signal driver 4 can provide excitation signals to the conductive element 300. The excitation signals will affect the object and further influencing the output voltage value from the enhanced capacitive fingerprint sensing units 100. The excitation signal buffer 410 can amplify or inverse the excitation signals. The excitation signal buffer 410 may be merged into the excitation signal driver 4, as a part of the fingerprint sensor 2. Detailed information about the excitation signals will be available in the following description. The I/O pads 150 are used to connect the fingerprint sensor 2 with external circuitry. Each I/O pad 150 has its specified functionality.

Please refer to FIG. 3. The enhanced capacitive fingerprint sensing unit 100 basically includes a fingerprint sensing structure 110 and a base structure 120. The fingerprint sensing structure 110 is formed above the base structure 120. The fingerprint sensing structure 110 has several substructures. They are a first inter-metal dielectric layer 111, a second metal layer 112, a second inter-metal dielectric layer 113, a third metal layer 114, and a passivation layer 115. The first inter-metal dielectric layer 111 can be made from common processes for manufacturing any inter-metal dielectric layer in an integrated circuit. Different from conventional sensing units for a fingerprint sensor, the depth of the first inter-metal dielectric layer 111 should be thick enough. The reason that it needs a thicker depth will be discussed later. As shown in FIG. 3, a first depth d1 of the first inter-metal dielectric layer 111 between adjacent metal layers is indicated. The first depth d1 should be greater than 3 μm, e.g. 5 μm.

The second metal layer 112 is formed above the first inter-metal dielectric layer 111 to work as a sensing metal plate. The second metal layer 112 forms several capacitances (capacitors, tangible or intangible) with adjacent objects. For example, as shown in FIG. 4 and FIG. 5, the second metal layer 112 and a finger 200 form a finger capacitance 110b when the finger 200 comes close to the fingerprint sensing unit 100. Namely, the second metal layer 112 and the finger 200 are components of a capacitor and whose capacitance value varies as the distance between a close-in portion of the finger 200 and the second metal layer 112 changes. Generally, the capacitance value is reversely proportional to the distance.

The second inter-metal dielectric layer 113 is formed above and around the second metal layer 112. It covers the sensing metal plate (the second metal layer 112). In order to minimize the capacitance between the third metal layer 114 and the second metal layer 112 (reasons of this will be illustrated below), a second depth d2 of the second inter-metal dielectric layer 113 between adjacent metal layers should be larger than what is conventionally implemented. The second depth d2 should be greater than 3 μm, e.g. 5 μm.

The third metal layer 114 is formed above the second inter-metal dielectric layer 113. The third metal layer 114 forms a rectangle cell with an opening located above the second metal layer 112. Meanwhile, it connects to an ESD protective unit 500 for bypassing any ESD stress. An architecture of the ESD protective unit 500 is shown in FIG. 6. The ESD protective unit 500 may be formed out of the fingerprint reader 1 and on a printed circuit board (not shown). The ESD protective unit 500 includes a number of Transient Voltage Suppressors (TVSs) and is used to maintain electric potential of the third metal layer 114 at signal ground. The TVS is an electronic component used to protect other sensitive electronic devices from voltage spikes induced on connected wires. A portion enclosed by a dashed frame is used for illustration in FIG. 6.

As shown in FIG. 6, each I/O pad 150 may have individual functionality. In this embodiment, the excitation signal pad 150a is connected to the conductive element 300 on the printed circuit board through a connection line 301 to send the excitation signals to the conductive element 300. An AVSS pad 150b is connected to a negative supply voltage node (VSS) 400 through a connection line 401 in the printed circuit board, where the VSS node 400 is also the signal ground node on the printed circuit board. An ESD protective pad 150c connects the third metal layer 114 to an ESD path (may be a chassis) through an ESD node 600 and connection line 601 on the printed circuit board for bypassing any ESD stress. The ESD protective unit 500 including two TVSs is used in the present embodiment in the connecting lines for the above connections. A first TVS 501 is mounted across the connection line 301 and the connection line 601. A second TVS 502 is mounted across the connection line 401 and the connection line 601. Normally, if the excitation signals are not higher than the threshold voltage of the first TVS 501, the excitation signals will be passed from the excitation signal pad 150a to the conductive element 300. In contrast, if the voltage on the connection line 301 is higher than the threshold voltage, the first TVS 501 will form a path to release the excessive charges accumulated on the connection line 301 to the ESD node 600 for bypassing the ESD stress. Similarly, if the voltage on the connection line 401 is higher than the threshold voltage of the second TVS 502, the second TVS 502 will form a path to release the charges to the ESD node 600. Of course, the ESD protective unit 500 can be used to protect as many elements in the fingerprint reader 1 as possible. The number of the TVSs is not limited to 2 as described.

Another example of arrangement of the ESD protective unit 500 is shown in FIG. 7. All elements and connections are the same as the last example except that the connection line 601 is cut off. The ESD node 600 and the second TVS 502 are linked by a connection line 602. The ESD protective pad 150c and the first TVS 501 are linked by a connection line 603. In addition, another connection line 604 is formed across the connection line 401 and the connection line 603. The arrangement of the ESD protective unit 500 has the same functions as that in FIG. 6.

The function of the conductive element 300 is to receive a first voltage and a second voltage ($V_{in}$ shown in FIG. 4) from the excitation signal driver 4 via the excitation signal buffer 410. The first voltage and the second voltage are so-called excitation signals. The only limitation is that a threshold voltage to trigger each TVS should be higher than the first voltage and/or the second voltage. (In present embodiment, the second voltage comes after the first voltage and it forms a voltage drop). Otherwise, any voltage higher than the threshold voltage will be released to avoid damaging the circuit in the enhanced capacitive fingerprint sensing unit 100. The topmost layer is a passivation layer 115. It covers the third metal layer 114 and protects the layers below from impact and scratch.

The base structure 120 has at least one first metal layer 121. The at least one first metal layer 121 provides interconnection of the circuit elements such as the capacitors and switches in the base structure. With the at least one first metal layer 121, the base structure 120 forms a charging circuit 122 and an operating circuit 124. The charging circuit 122 and the operating circuit 124 are illustrated by dashed frames in the equivalent circuit in FIG. 4. Main goals of the base structure 120 are alternatively receiving a stable charging voltage ($V_{dd}$), and sharing electric charges from the charging circuit 122 to the capacitances of the operating circuit 124 and fingerprint sensing structure 110 while stopping receiving the charging voltage.

The charging circuit 122 has a charging capacitor 1221 built inside. The charging capacitor 1221 is used to store electric charges when the charging voltage is applied. One side of the charging capacitor 1221 is connected to the signal ground. Therefore, the charging capacitor 1221 will be charged to the stable voltage $V_{dd}$ during the charging stage (S03 which will be described below). The charging capacitor 1221 may be implemented by circuit elements such as MOS or Poly-to-Poly capacitor. The capacitance of the charging capacitor 1221 is determined by the geometry of the MOS gate or Poly silicon. Meanwhile, the other equivalent capacitance $C_p$ and $C_f$ which will be introduced later naturally exist when the enhanced capacitive fingerprint sensing unit 100 is formed or when the finger 200 comes close to the enhanced capacitive fingerprint sensing unit 100.

The charging circuit 122 also has two switches, a charging switch 1222 and a sharing switch 1223. When the charging switch 1222 is turned on and the sharing switch 1223 is turned off, the charging voltage will be applied to the charging circuit 122 and the charging capacitor 1221 ($C_r$) is charged to the charging voltage $V_{dd}$. When the charging switch 1222 is turned off while the sharing switch 1223 remains off, the charging voltage supply stops, and the charging capacitor 1221 ($C_r$) retains the charging voltage $V_{dd}$. The sharing switch 1223 is formed to separate the operating circuit 124 from the charging circuit 122. It switches operations of receiving a charging voltage (as mentioned above, when the charging switch 1222 is turned on) and sharing electric charge. Namely, when the sharing switch 1223 is turned off, the charging circuit 122 and the operating circuit 124 are isolated from each other. On the other hand, when the sharing switch 1223 is turned on, the charging circuit 122 and the operating circuit 124 are connected to each other and electric charges can move there between, so that a new balanced distribution of electric charges is achieved.

The charging circuit 122 further includes a buffer 1224. The buffer 1224 is used to isolate the capacitive fingerprint sensing unit 100 from other processing circuits (not shown) and to deliver output voltage $V_{out}$ to the subsequent processing circuit (not shown). Usually, the buffer 1224 is made of voltage follower.

The operating circuit 124 is a general term for the elements in the base structure 120 but not belong to the charging circuit 122. In other words, any element in the base structure 120 separated from the charging circuit 122 by the sharing switch 1223 is a part of the operating circuit 124. Functions of the operating circuit 124 will be illustrated later with the operation of the enhanced capacitive fingerprint sensing unit 100. The operating circuit 124 has a discharging switch 1241. The discharging switch 1241 is used for resetting (discharging) the voltage of the operating circuit 124 and that of the second metal layer 112 to signal ground when the sharing switch 1223 is off. As mentioned above, several capacitances naturally exist. In order to have a better understanding of the operation of the enhanced capacitive fingerprint sensing unit 100, all these capacitances are embodied by equivalent capacitors. A parasitic capacitance exists between the second metal layer 112 and all other metal layers in the operating circuit 124, and a parasitic capacitor 124a is used for illustration.

When the finger 200 approaches the passivation layer 115, signal capacitance is formed between the finger 200 and the conductive element 300. Meanwhile, a finger capacitance is formed between the finger 200 and the sensing metal plate (the second metal layer 112), and a metal grid capacitance is formed between the finger 200 and the third metal layer 114. Similarly, a signal capacitor 110a, a finger capacitor 110b and a metal grid capacitor 110c are used for illustration, respectively. FIG. 5 illustrates the fingerprint sensing structure 110 and each of the equivalent capacitors located therein by showing two adjacent enhanced capacitive fingerprint sensing unit 100 (separated by dashed lines).

Figures 1A, 1B:
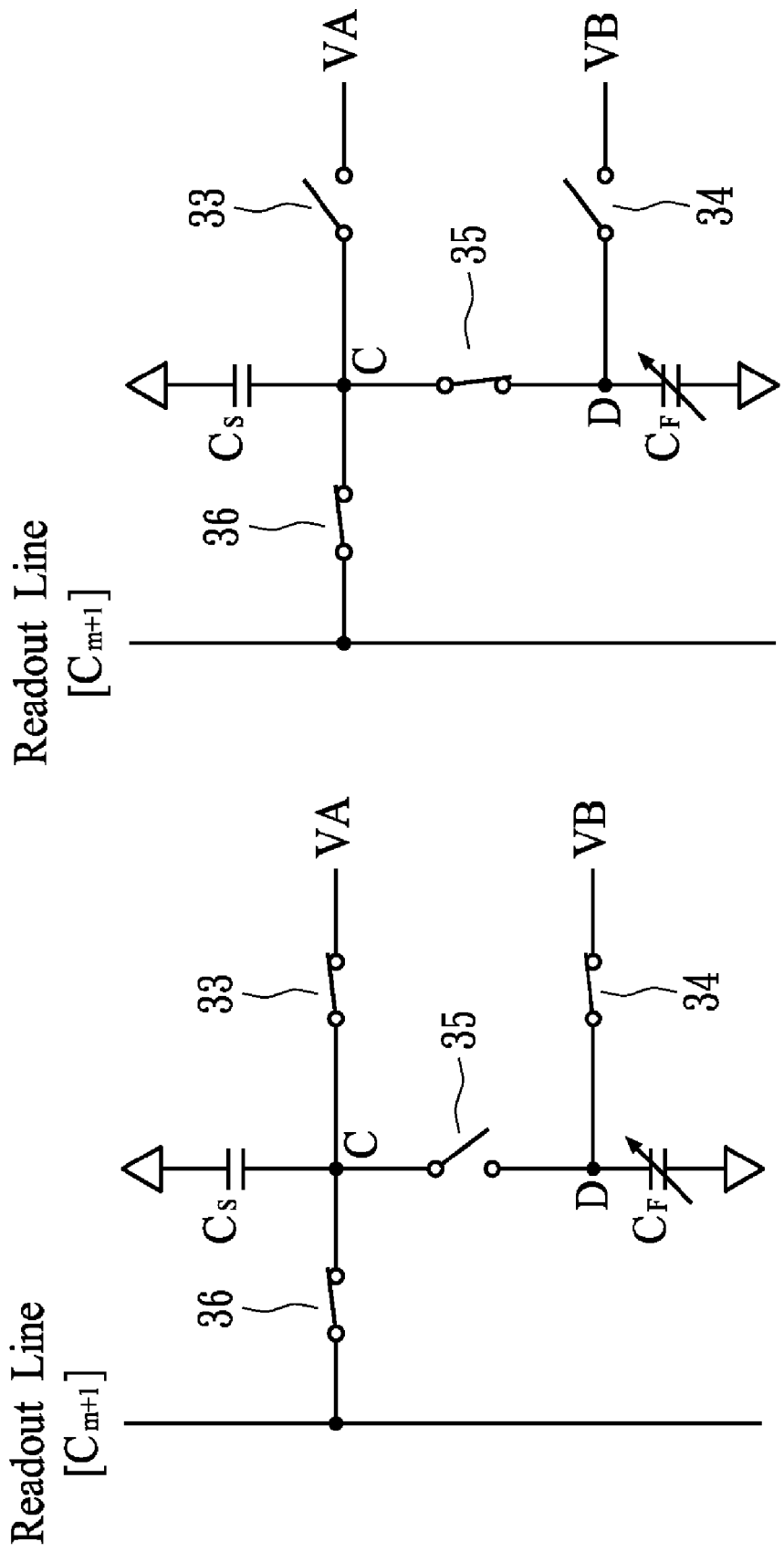
FIG. 1A and FIG. 1B show a conventional fingerprint sensor.

It should be emphasized that the fingerprint sensing array 10 (or fingerprint sensor) in FIG. 1 is formed by arranging the enhanced capacitive fingerprint sensing units 100 in an array with the same structure adjacent to each other at the same level, and the third metal layers 114 of all enhanced capacitive fingerprint sensing units 100 are connected. Hence, a metal grid 11 is formed. Considering that the total area of the connected third metal layer 114 is much larger than the individual sensing plate (the second metal layer 112), the capacitance of the metal grid capacitor 110c is much larger than that of the finger capacitor 110b and that of the parasitic capacitor 124a. Also, the contacted area between a user's finger and the conductive element 300 needs to be as large as possible, such that the capacitance of the signal capacitor 110a is much larger than that of the finger capacitor 110b and of the parasitic capacitor 124a. The reason for the design mentioned above will be describe in later paragraph.

The enhanced capacitive fingerprint sensing unit 100 works with the following procedure which consists of distinct and repeated stages. Please refer to FIG. 10. There are three main stages: a setup stage, a charging stage, and a sharing stage. At the setup stage, the sharing switch 1223 is turned off (S01) so that the charging circuit 122 and the operating circuit 124 are disconnected.

In the charging stage, first, the first voltage $V_1$ is applied to the conductive element 300, and the operating circuit 124 and the second metal layer 112 are discharged to signal ground (resetting) by turning on the discharging switch 1241 (S02). Then, the charging voltage is applied to the charging circuit 122 by turning on the charging switch 1222 (S03). In the last step of the charging stage, the discharging switch 1241 and the charging switch 1222 are turned off (S04). It should be noticed that the sequence of S02 and S03 may be swapped, or the two steps may occur at the same time. At the end of the charging stage, the charging capacitor 1221 is charged to the charging voltage $V_{dd}$, while the equivalent capacitors are charged to the first voltage $V_1$.

Following the charging stage is the sharing stage. During the sharing stage, the following operations occur substantially at the same time: turning on the sharing switch 1223 and providing the second voltage to replace the first voltage (S05). In fact, one may occur a little earlier. The order doesn't affect the result. When the voltage at the buffer 1224 is stable, the output voltage $V_{out}$ is measured. It should be noticed that when the second voltage takes place, a voltage variation is obtained in the charging circuit 122. It is obvious that the distribution of electric charges in the enhanced capacitive fingerprint sensing unit 100 will change, further influencing the output voltage $V_{out}$. Actually, the influence of the output voltage comes from two sources, the sharing of electric charges and the voltage change from the excitation signal buffer 410 (difference between the second voltage and the first voltage). $V_{out}$ can be a sum of voltage values contributed from the two sources. It will be illustrated below.

To illustrate the sharing stage more clearly, an equivalent circuit is depicted in FIG. 4. $V_{dd}$ is a value of the charging voltage, $V_1$ and $V_2$ (shown as $V_{in}$) are values of the first and of the second voltage, respectively, $C_r$ is a capacitance value of the charging capacitor, $C_p$ is a value of the parasitic capacitance, $C_f$ is a value of the finger capacitance, $C_g$ is a value of capacitance between the third metal layer and the finger, $C_s$ is a value of capacitance between the conductive element 300 and the finger, and the output voltage $V_{out}$ is the voltage across $C_r$, measured by the output buffer 1224.

$$V_{out} = \frac{C_r}{C_p + C_f + C_r} V_{dd} + \frac{1}{\left(1 + \frac{C_p + C_r}{C_f}\right)\left(1 + \frac{C_g}{C_s}\right)}(V_2 - V_1)$$

where $C_g$, $C_s \gg C_p$, $C_r$, which makes the all small terms negligible. By the theory of linear circuit, the net effect of the charge sharing through the sharing switch 1223 and the driving voltage change from $V_1$ to $V_2$ is the sum of the voltages of which charge sharing through the sharing switch 1223 and the driving voltage change from $V_1$ to $V_2$ are applied separately. An equivalent circuit of the charge sharing through the sharing switch (without the voltage change from $V_1$ to $V_2$) is depicted in FIG. 8. An equivalent circuit of the voltage drop from $V_1$ to $V_2$ on input buffer (without $C_r$ being charged to $V_{dd}$) is depicted in FIG. 9. Let $V_{01}$ represents the voltage change of $V_{out}$ when the sharing switch is turned on at the sharing stage, but the input driver remains at the same voltage $V_1$, and $V_{02}$ represents the voltage change of $V_{out}$ when the input buffer changes from $V_1$ to $V_2$ while charging capacitor is not charged to $V_{dd}$. The net result of $V_{out}$ will be:

$$V_{out} = V_{01} + V_{02}$$

where $$V_{01} = \frac{C_r}{C_p + C_f + C_r} V_{dd}$$

and $$V_{02} = \frac{1}{\left(1 + \frac{C_p + C_r}{C_f}\right)\left(1 + \frac{C_g}{C_s}\right)}(V_2 - V_1)$$

For the naturally formed capacitance $C_p$, its values are determined according to the physical structure and material of the enhanced capacitive fingerprint sensing unit 100. The variable finger capacitance $C_f$ is determined by the distance of from the second metal layer 112 to the valley or ridge portion of the fingertip that touches the sensor. The charging capacitance $C_r$ is formed by a circuit component inside the at least one first metal layer 121 which can be determined by the geometry of the circuit element (such as MOS transistor or Poly-to-Poly capacitor) which implements charging capacitance $C_r$. In order to justify our structure design of the enhanced capacitive fingerprint sensing unit 100, the first derivative of $V_{out}$ with respect to $C_f$ should be given. Therefore, we have:

$$\frac{dV_{out}}{dC_f} = \frac{dV_{01}}{dC_f} + \frac{dV_{02}}{dC_f}$$

wherein $$\frac{dV_{01}}{dC_f} = -V_{dd} \cdot \frac{C_r}{(C_p + C_f + C_r)^2}$$

and $$\frac{dV_{02}}{dC_f} = \frac{C_s(C_p + C_r)*(C_g + C_s)}{(C_f*C_g + C_f*(C_p + C_r) + C_g*(C_p + C_r) + C_f*C_s + C_s*(C_p + C_r))^2}.$$

Since $C_s$ and $C_g$ are much greater than $C_f$ and $C_p + C_r$, than we have $$\frac{dV_{02}}{dC_f} = (V_2 - V_1) \cdot \frac{C_s(C_p + C_r)}{(C_g + C_s)(C_f + C_p + C_r)^2}.$$

In order to improve the sensitivity, which can be represented as $$\left|\frac{dV_{out}}{dC_f}\right|,$$

the first term $$\frac{dV_{01}}{dC_f}$$

and the second term $$\frac{dV_{02}}{dC_f}$$

must have the same sign; in other words, if $V_{dd}$ is a positive value, then $V_2 - V_1$ must be negative, which means $V_1 > V_2$. Also it is obvious that the values of $C_p$ are preferred to be reduced and the value of $C_s$ is preferred to be increased so that the sensitivity, $$\left|\frac{dV_{out}}{dC_f}\right|,$$

can be increased. To achieve this goal, the depths of the first inter-metal dielectric layer 111 and the second inter-metal dielectric layer 113 need to be increased since the capacitance is reversely proportional to the distance between two conductive plates. By experiments, the first depth d1 and the second depth d2 should be greater than 3 μm. Since thickness of inter-metal dielectric layer in standard CMOS process is below 1 μm, this requirement may take special deposition process during manufacturing. Also, in order to achieve this goal, another requirement is that the total top surface area of the conductive element 300 must be large enough, since the capacitance between a user's finger and the conductive element 300 is mainly affected by the contact area therebetween. By experiments, the total top surface area of the conductive element 300 should be greater than 20 mm².

At the end of the sharing stage, when the distribution of electric charges reaches an equilibrium, the output voltage may be measured (S06). Since position of ridge and valley area of a finger above one enhanced capacitive fingerprint sensing unit 100 is reflected by the given output voltage, finally, translate the output voltage, sequentially from each enhanced capacitive fingerprint sensing unit 100, to a fingerprint image data corresponding to a portion of a user's fingerprint (S07).

It should be noticed that the voltages described above are relative voltages at different circuit nodes. If the value of the charging voltage $V_{dd}$ is positive, resetting process of the second metal layer 112 is to discharge to 0V or the signal ground. In this case, the second voltage after the first voltage forms a negative going step, and the voltage change from $V_1$ to $V_2$ is a voltage drop. It may be possible for the value of the charging voltage to be 0V. Under this condition, the resetting process of the second metal layer 112 is to charge to a positive value of voltage. In this case, the second voltage after the first voltage forms a positive going step, and the voltage change from $V_1$ to $V_2$ is a voltage rise. The 0V charging voltage with positive input voltage change mentioned above is an alternative for operating the enhanced capacitive fingerprint sensing unit 100.

Figure 11:
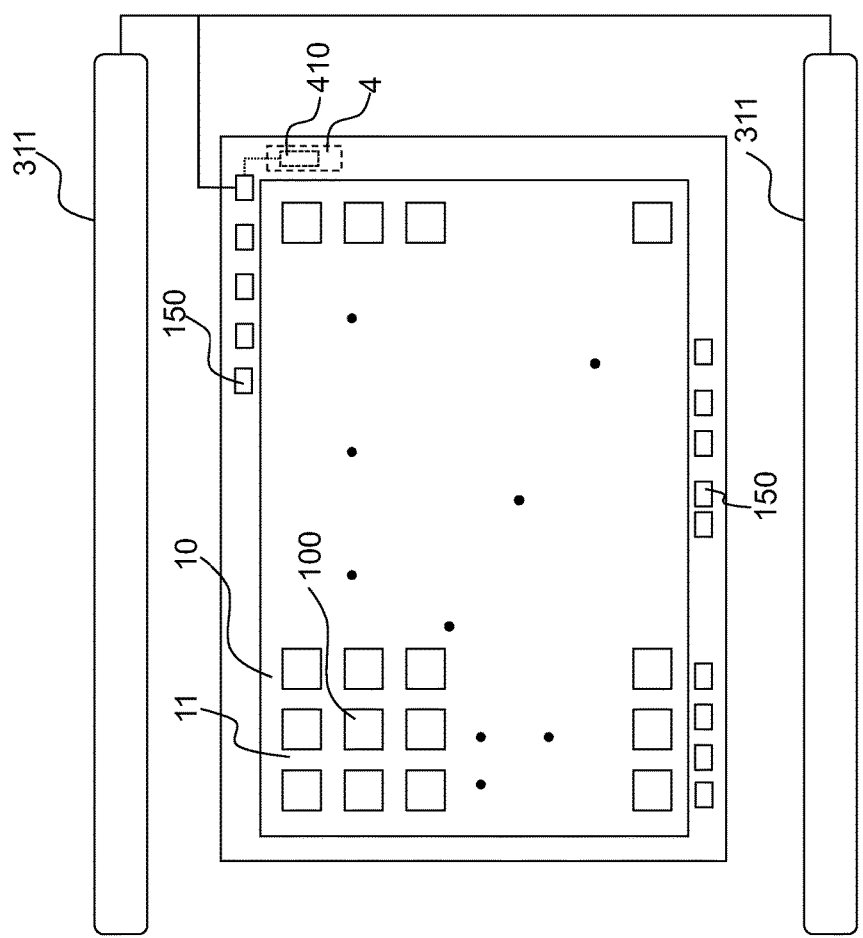
FIG. 11 is a top view of another fingerprint reader according to the present invention.

In another embodiment, the conductive element is not limited a metal annulus plate enclosing the enhanced capacitive fingerprint sensing units 100. Please see FIG. 11 where the elements with the same function mentioned in the previous embodiment are used for illustration. The conductive element 300 is replaced by a pair of metal strips 311. The metal strips 311 can receive the excitation signals from the excitation signal buffer 410, which is merged into the excitation signal driver 4, and influences the output voltage of the enhanced capacitive fingerprint sensing units 100. Of course, the metal strips 311 can be replaced by any desire-shaped metal plate and don't have to be physically connected with one another (but all metal strips 311 must electrically connected to the excitation signal buffer 410). The number of the desire-shaped metal plate is not limited.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A capacitive fingerprint sensing unit for a fingerprint reader, comprising:
   a base structure, having at least one first metal layer and forming a charging circuit and an operating circuit, for alternatively receiving a charging voltage and sharing electric charges from the charging circuit to a capacitance of the operating circuit while stopping receiving the charging voltage, and
   a fingerprint sensing structure, formed above the base structure, comprising:
   a first inter-metal dielectric layer, having a first depth greater than 3 µm;
   a second metal layer, formed above the first inter-metal dielectric layer and forming a sensing metal plate;
   a second inter-metal dielectric layer, formed above and around the second metal layer, covering the sensing metal plate and having a second depth greater than 3 µm;
   a third metal layer, formed above the second inter-metal dielectric layer, forming a rectangle cell with an opening located above the sensing metal plate, connecting to an Electrostatic Discharge (ESD) protective unit and maintaining electric potential of the third metal layer at signal ground; and
   a passivation layer, covering the third metal layer,
   wherein the base structure shares electric charges from the charging circuit to capacitances of the fingerprint sensing structure while stops receiving the charging voltage.

2. The capacitive fingerprint sensing unit according to claim 1, wherein the ESD protective unit is connected to an ESD path for bypassing any ESD stress.

3. The capacitive fingerprint sensing unit according to claim 1, wherein the ESD protective unit contains at least one Transient Voltage Suppressor (TVS) device.

4. The capacitive fingerprint sensing unit according to claim 1, wherein a charging capacitor is built in the charging circuit for storing electric charges when the charging voltage is received and a parasitic capacitance exists in the operating circuit and a portion of the sensing structure.

5. The capacitive fingerprint sensing unit according to claim 1, wherein when a finger approaches the passivation layer, a signal capacitance is formed between the finger and the conductive element and a finger capacitance is formed between the finger and the sensing metal plate.

6. The capacitive fingerprint sensing unit according to claim 1, wherein a sharing switch is formed between the operating circuit and the charging circuit, for switching operations of receiving the charging voltage and sharing electric charges.

7. The capacitive fingerprint sensing unit according to claim 5, wherein the excitation signals comprise a first voltage and a second voltage.

8. The capacitive fingerprint sensing unit according to claim 7, wherein a voltage variation is obtained in the charging circuit when the second voltage takes place and the charging voltage stops being applied and the sharing switch turns on.

9. The capacitive fingerprint sensing unit according to claim 8, wherein the output voltage is, $$V_{out} = \frac{C_r}{C_p + C_f + C_r} V_{dd} + \frac{1}{\left(1 + \frac{C_p + C_r}{C_f}\right)\left(1 + \frac{C_g}{C_s}\right)} (V_2 - V_1)$$

wherein $V_{out}$ is a value of the output voltage, $V_{dd}$ is a value of the charging voltage, $V_1$ and $V_2$ are values of the first and of the second voltage, respectively, $C_r$ is a value of the charging capacitor, $C_p$ is a value of the parasitic capacitance, $C_f$ is a value of the finger capacitance, $C_g$ is a value of capacitance between the third metal layer and the finger, $C_s$ is a value of capacitance between the conductive element and the finger.

10. The capacitive fingerprint sensing unit according to claim 9, wherein a discharging switch is formed in the operating circuit, for resetting the voltage of the operating circuit and that of the second metal layer to signal ground when the sharing switch is off.

11. The capacitive fingerprint sensing unit according to claim 1, wherein the same base structures or the fingerprint sensing structures are adjacent to each other at the same level and the third metal layers of all fingerprint sensing units are connected so that a metal grid is formed.

12. A fingerprint reader using the capacitive fingerprint sensing unit in claim 1, comprising:
    a fingerprint sensor, including a fingerprint sensing array formed of a plurality of capacitive fingerprint sensing units and an excitation signal driver; and
    a conductive element,
    wherein the excitation signal driver is an electrical component controlled by the fingerprint sensor for providing excitation signals to the conductive element.

13. The fingerprint reader according to claim 12, wherein the conductive element is one or more metal strip(s) located close to the array of fingerprint sensing units or a metal annulus plate enclosing the array of sensing units.

14. A method to acquire a fingerprint using the fingerprint reader according to claim 12, comprising the steps of:
    turning off the sharing switch to disconnect the charging circuit from the operating circuit;
    applying the first voltage to the conductive element and resetting the operating circuit and the second metal layer by turning on the discharging switch;
    applying the charging voltage to the charging circuit;
    turning off the discharging switch and the charging switch;
    turning on the sharing switch and providing the second voltage to replace the first voltage;
    measuring the output voltage; and
    translating the output voltage, from each enhanced capacitive fingerprint sensing unit, to a fingerprint image data corresponding to a portion of a user's fingerprint.

15. The fingerprint reader according to claim 12, further comprising an excitation signal buffer, linked between the fingerprint sensor and the conductive element.

* * * * *